Feb. 2, 1954
A. L. BAKER
2,667,693
SURVEYING INSTRUMENT
Filed March 5, 1949
2 Sheets-Sheet 1
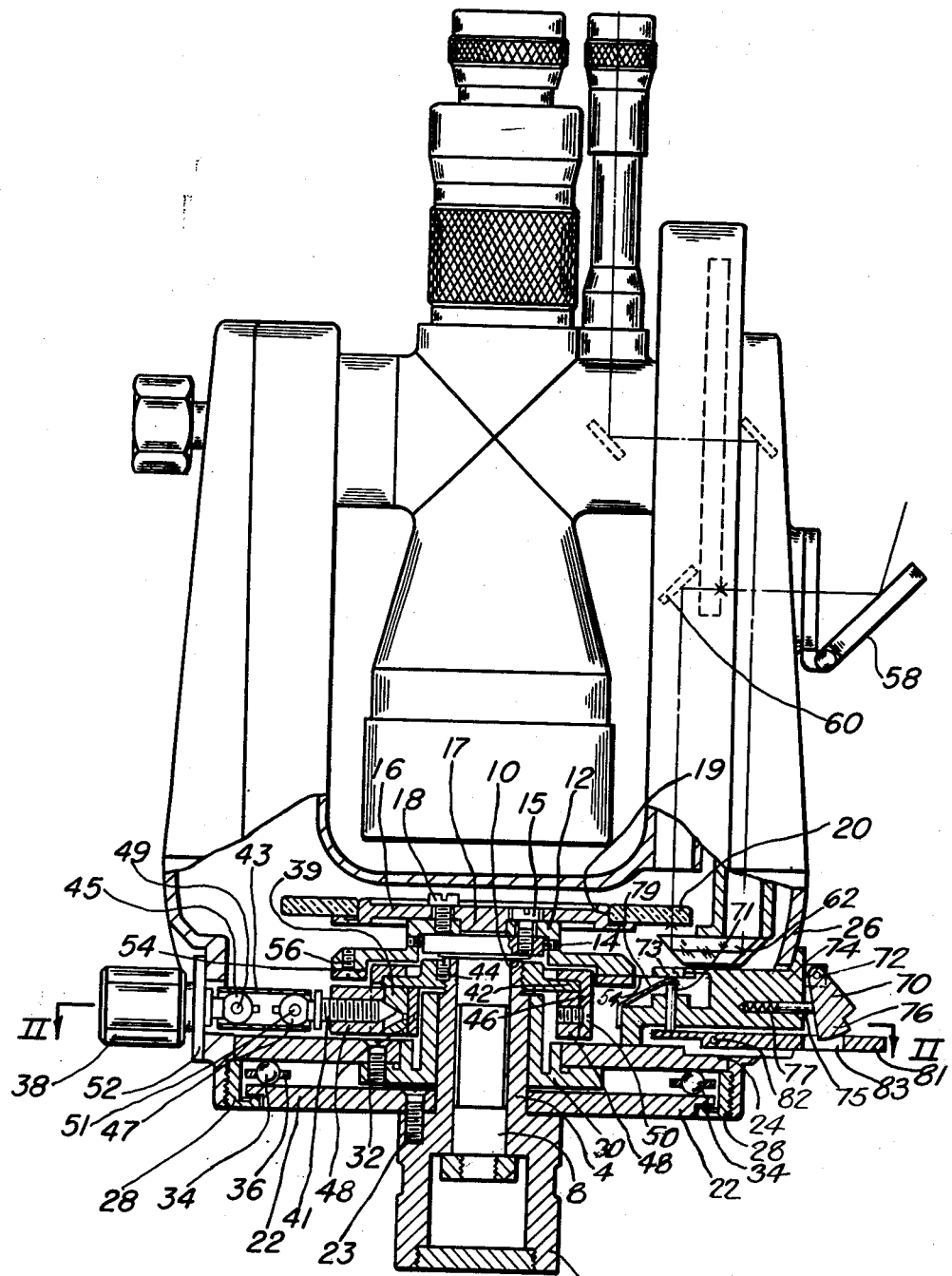
Fig. I
INVENTOR.
ALLISTER L. BAKER
BY
J. Russell Juten
ATTORNEY

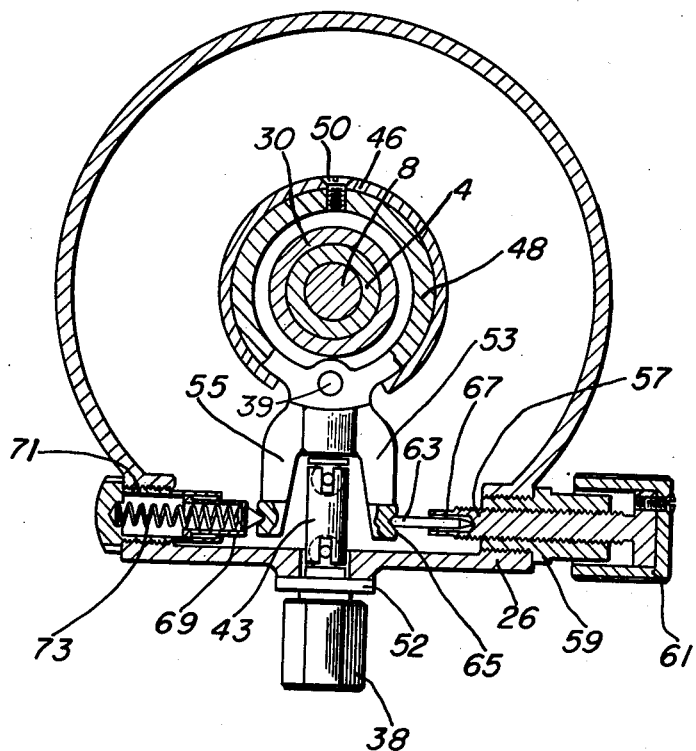
Fig. II
INVENTOR.
ALLISTER L. BAKER

Patented Feb. 2, 1954

2,667,693

UNITED STATES PATENT OFFICE 2,667,693

SURVEYING INSTRUMENT

Allister L. Baker, Jersey City, N. J., assignor to Keuffel & Esser Company, Hoboken, N. J., a corporation of New Jersey Application March 5, 1949, Serial No. 79,791

8 Claims. (Cl. 33—72)

The subject matter of this patent may be used by or for the Government for governmental purposes without the payment of any royalties to me.

This invention relates to the art of surveying instruments and theodolites or other instruments used for measuring angles in azimuth. Instruments of this type are usually provided with a telescope supported on suitable standards which are free to turn about a vertical axis. A graduated circular scale or protractor is also provided with respect to which the position of the standards and telescope may be read. For taking repeating or directional readings it is also essential that the graduated circular scale or protractor be free to turn about the same vertical axis as the standards.

It has been the custom in the art to accomplish the above result by a system of "centers." Such "center" systems were generally of two types "adjacent" or "independent center." In the "adjacent" type the alidade or standards with telescope is secured to a "male center" or spindle which has a generally cylindrical form and may or may not be tapered. The "male center" fits in a "female center" which carries the protractor. The "female center" is in turn provided with an outer bearing surface which fits a female bearing surface in the base of the instrument which latter is normally fastened through a levelling head to a tripod.

In the independent system of centers, the alidade is secured to a "male center" which fits in a female bearing provided in the base of the instrument. The protractor is provided with a "female center" independently engaging a concentric male bearing surface provided on the base of the instrument.

By mounting the protractor on a male center and the alidade on a female center, a novel form of center system has been made which has important advantages in many types of instruments.

The invention is particularly useful in the type of surveying instruments using a glass circle as a protractor or graduated circular scale. These instruments are usually provided with an optical micrometer system for reading the circle and are referred to as optically read theodolites.

One object of the invention is to produce a more fully enclosed surveying instrument.

Another object of the invention is to produce a theodolite with fully enclosed glass circle with repeating and directional clamps which is of particularly advantageous and simple construction.

Another object of the invention is to permit the glass circle in an optically read theodolite to be mounted in such a manner as to minimize the effect of the difference in coefficients of expansion between the glass and center materials and to provide a construction in which the glass circle remains accurately centered during all normal temperature changes.

Another object of the invention is to provide a new type of clamp and tangent screw arrangement for a surveying instrument which has less tendency to strain the centers than the conventional type.

These and other objects of the invention and the means of their attainment will become more apparent from the following description taken in connection with the accompanying drawings in which:

Figure I is a view in elevation partly in section showing one embodiment of the invention.

Figure II is a view in sectional plan taken along the line II—II of Figure I and looking in the direction of the arrows.

Referring to Figure I, the base of the instrument is provided with a projecting member 2 for fitting a universal tribrach or levelling head not shown. The member 2 extends upward to form the main bearing 4. The male center or spindle 8 fits in the main bearing 4 and is supported in the vertical direction by the flange 10 resting on the upper surface of the main bearing or middle center 4.

In the embodiment of Figure I, a centering member 12 is supported in sliding contact above the flange 10 of the male center 8. Centering screws 14 are provided for centering the centering member 12 and thereby the glass circle or protractor 20 on the vertical axis of the instrument. After centering, the centering member 12 may be locked to the male center 8 by the locking screws 15.

It is customary to make the centers of surveying instruments of alloys such as bronze or the like although steel may also be used. Bronze alloys have a considerably higher coefficient of expansion than glass and steel also has a higher coefficient of expansion than glass although not as high as that of bronze. In either case the mounting of the circle on its center presents a problem. In the embodiment of Figure I this problem is solved by mounting the circle 20 on the circle holding plate 18 which is made of a material having the same coefficient of expansion such as a suitable alloy of iron and nickel. The inside diameter of the glass circle 20 fits closely over the cylindrical surface 19 of the same diameter provided on the circle holding plate 16. There can be no strain or play produced at these contacting surfaces by temperature changes because the plate 16 has the same coefficint of expansion as the glass circle.

The circle holding plate 16 is provided with a downwardly projecting stud 17 of small diameter. The stud 17 fits in an opening in the centering member 12 and the parts are held together by three screws 18. The centering member 12 may be made of the same material as the male center 8. Because of the small diameter of the stud 17 there will be only a relatively small difference in expansion between the stud 17 and the centering member 12. This small difference in expansion will be absorbed by the elastic properties of the materials.

Alternatively an upwardly projecting stud may be provided on the centering member 12 fitting a hole in the circle holding plate or the glass circle 20 itself could be made with a very small inside diameter to fit such a stud or equivalent means for mounting it to the centering member 12.

The lower flat steel plate 22 rests on a horizontal flange provided on the projecting member 2 and is secured thereto by the screws 23. The upper flat steel plate 24 is secured to the alidade 26 by the closing ring 28. The outer center or annular bearing 30 is secured to the upper flat steel plate 24 as by the screws 32. The outer center 30 has an internal bearing surface bearing against an outer surface of the main bearing 4. The outer center 30 keeps the alidade 26 centered on the vertical axis of the instrument. To this end it is essential that the inner and outer cylindrical surfaces of the main bearing 4 be concentric to as great a precision as it is possible to achieve. If these surfaces are eccentric even though protractor 20 has been centered by the screws 14 for one of its positions, it will become eccentric when turned with respect to the main bearing and thus introduce eccentricity errors into the readings taken with the instrument unless an averaging system for reading the circle is provided.

The steel balls 34 between the steel plates 22 and 24 support the weight of the alidade 26 vertically while permitting its free rotation about the vertical axis. The balls 34 and steel plates 22 and 24 are precisely made to prevent tilting of the alidade during rotation. The retaining ring 36 holds the balls 34 in approximately the same radial position and properly spaced.

The clamp knob 38 operates to clamp the alidade 26 to the main bearing 4 by means of a novel type of surveying instrument clamp as shown. The annular flange member 42 is attached to the main bearing 4 by the cooperating threads on the two members. A screw 44 may also be provided to prevent the annular flange member 42 from becoming loosened during use. An upper ring 46 rests on the annular flange member 42 and extends downwardly around it. An under ring 48 has an external surface fitting within the downwardly extending portion of the upper ring 46 and is attached thereto at one point of their engaging cylindrical surfaces as by a screw 50. The screw 50 should be on the opposite side of the centers from the clamp knob 38. The upper surface of the under ring 48 is substantially parallel to the under surface of the annular flange member 42 but is not in such intimate contact with it to prevent relative rotation between the members 46 and 48 and the annular flange member 42.

A clamp screw receiving nut forms part of the under ring 48 to provide a threaded hole radial thereto. The clamp screw 41 is rotated by means of the clamp knob 38 through the expansible coupling 43. The expansible coupling 43 is in the form of a hollow tube in which the ball joints 45 and 47 are fitted. The ball joints 45 and 47 are provided with diametrical pins 49 and 51 which fit in slots in the walls of the hollow tube 43. The pins 49 and 51 transmit rotation from the clamp knob 38 to the clamp screw 41, but the slots in the hollow tube 43 permit the screw 41 to move axially in the threads while the clamp knob 38 remains axially fixed so that it may be sealed against the entrance of dirt, etc. The latter objective is accomplished by the bushing plate 52 within which the extension of the clamp knob 38 rotates and which is secured to the alidade casing 26.

The clamp screw 41 is provided with a conical point fitting in a conical recess in a pin 39. The engagement at these conical surfaces transforms the horizontal movement of the clamp screw to a vertical movement of the pin 39. The annular flange member 42 is thus clamped between the upper ring 46 and the pin 39 by the action of the clamp screw 41 on the pin 39.

Referring to Figure II, the under ring 48 is provided with two integral projections 53 and 55 which are spaced on opposite sides of the expansible coupling 43. The tangent screw 57 engages an internally threaded bushing 59 secured to the alidade casing 26 as by external threads as shown.

The tangent screw 57 is provided with a tangent screw knob 61. The tangent screw pin 63 is held between the projection 53 and the tangent screw 57 by the recess 65 in the projection 53 and the recess 67 in the tangent screw 57.

A plunger 69 in the tube 71 is pressed against the projection 55 by the spring 73. The tube 71 is mounted in the alidade casing 26 as shown and is provided with a closed end to restrain the spring 73.

The tangent screw 57 may be turned by means of the tangent screw knob 61 to adjust the alidade's position with respect to the main bearing 4 when the clamp screw clamps the annular flange member 42 between the rings 46 and 48.

A thin clamp plate 54 is secured to the centering member 12 by screws 56. See Figure I. A pin clamp 70 when closed clamps the alidade 26 to the clamp plate 54 by means of a pin which bends the clamp plate 54 very slightly against a flat friction surface 73 provided on the body 74 carried by the alidade. The pin clamp need not necessarily take the exact form shown in the drawing. In the drawing, the pin clamp is made up of a lever 70 pivoted at 72. The lever 70 is urged outwardly by a plunger 75 actuated by a spring 77. The pin 71 slides in an opening provided in the body 74 and is urged downwardly by a spring 79. A second lever 81 pivoted at 82 engages the lower end of the pin 71 at one of its ends. The other end of the lever 81 is provided with an opening 83 which can engage the lower end 76 of the lever 70.

The pin clamp 70 is shown in closed position. To open the clamp, the lever 70 is pushed in against the plunger 75 which is actuated by the spring 77. The spring 79, then pushes the pin 71 downwardly and the lever 81 is pushed upward at its outer end so that the lower part 76 of the lever 70 engages the opening 83 in the lever 81.

To close the clamp 70, the lever 81 is pushed downward on its outer end so that the pin 71 is pushed upward against the clamp plate 54. The clamp plate 54 is bent slightly into frictional engagement with the upper part 73 of the body 74. The lever 70 is then urged outwardly by the plunger 75 and the lower surface of the lever 70 holds the outer end of the lever 81 down. When the pin clamp is closed the protractor 20 turns with the alidade 26 in repeating type observations.

The adjustable reflector 58 directs light into the instrument to the reflector 60 which directs it downwardly to illuminate the divisions on one side of the glass protractor scale 20. The proportion of the scale adjacent to the prism 62 is imaged by the prism 62 as well as other reflectors and lenses not shown onto a reticle which may be seen through an eyepiece to read the angular setting of the glass circle 20.

The rest of the instrument which is not shown in the drawings may be according to designs known in the art. In some embodiments it may be desirable to use balls or ball bearings between the centers to reduce friction.

The invention is shown in the drawing incorporated in an instrument of a non-averaging optical type but is not necessarily so limited. It could readily be adapted for instruments of the averaging type or for other types of surveying instruments. No limitation of the invention is intended other than those imposed by the appended claims.

Having thus described the invention what is claimed is:

1. In a surveying instrument the combination comprising a main bearing which may be mounted on a levelling head, said main bearing having a vertical bore passing completely therethrough and at least a portion of which forms an inside bearing surface of said main bearing, a male center centered within said inside bearing surface of said main bearing, means carried at the bottom end of said male center engaging a lower horizontal surface of said main bearing and preventing any substantial vertical movement of said male center, a protractor scale mounted on said male center, an outer center centered around an outside bearing surface of said main bearing, an alidade having a telescope mounted on said outer center, said main bearing having an extension above said outer center, clamp means acting between said alidade and said extension of said main bearing above said outer center, fine adjustment means associated with said clamp means and acting between said alidade and said main bearing and clamp means between said alidade and said protractor scale.

2. In a surveying instrument the combination comprising a main bearing which may be mounted on a levelling head, a male center centered within an inside bearing surface of said main bearing, said male center having a higher coefficient of expansion than glass, a mount for a glass circle of an alloy of iron and nickel having the same coefficient of expansion as the glass symmetrically mounted with respect to the axis of the male center and secured on said male center near the axis of the male center, a glass circle having a protractor scale fitting a cylindrical portion of said mount, an outer center fitting an outside bearing surface of said main bearing and an alidade having a telescope mounted on said outer center.

3. In a surveying instrument the combination comprising a main bearing which may be mounted on a levelling head, a male center fitting an inside bearing surface of said main bearing; an outer center fitting an outside bearing surface of said main bearing, an alidade having a telescope mounted on one of said centers, a protractor scale mounted on the other center, a clamp acting between said alidade and said main bearing made up of an annular flange on said main bearing, upper and lower members for engaging the upper and lower surfaces of said flange, and a clamp screw with a substantially conical point engaging a substantially conical hole in one of the members to force it into engagement with the annular flange and a tangent screw arrangement providing a fine adjustment between said alidade and said members which may be clamped to said flange on said main bearing made up of two projections on one of said members which may be clamped projecting on opposite sides of said clamp screw, a tangent screw threadably mounted to said alidade engaging one of said projections, and a plunger engaging the other of said projections operated by a spring acting between it and said alidade.

4. In a surveying instrument having a system of centers permitting relative angular motion of a plurality of fundamental parts of the instrument, a clamp acting between two of said fundamental parts comprising an annular flange on one of said parts, members for engaging the upper and lower surfaces of said flange and a clamp screw carried by the other of said fundamental parts with a conical point engaging a conical hole in one of said members to force it into engagement with said annular flange.

5. In a surveying instrument having a system of centers permitting relative angular motion about a vertical axis between an alidade, a divided circle and a base of the instrument, said three parts being fundamental parts of the instrument a clamp acting between two of said fundamental parts comprising a screw actuating a clamping means inside the instrument, a clamp knob mounted for rotation outside the instrument and an expansible coupling having a ball joint on each end joined to the clamp screw on one end and to the clamp knob on the other end and a tangent screw arrangement providing a fine adjustment between said two fundamental parts comprising two projections which may be secured to one of the fundamental parts by said clamp projecting on opposite sides of and spaced from said expansible coupling having a ball joint on each end, a tangent screw threadably mounted to the other of said fundamental parts engaging one of said projections on the opposite side thereof from said expansible coupling, and a plunger operated by a spring carried by the same fundamental part as said tangent screw engaging the other of said projections on the opposite side thereof from said expansible coupling.

6. In a surveying instrument having an alidade, a base for mounting the instrument on a levelling head and a protractor scale, the combination of a main bearing having concentric inner and outer cylindrical surfaces carried by said base, a spindle mounted for rotation within said main bearing about the axis of its inner cylindrical surface carrying the protractor scale, an annular bearing mounted for rotation on the outside of said main bearing about the axis of its outer cylindrical surface, said alidade being centered on the axis of said main bearing by said annular bearing, a first flat circular plate fitting over the outer cylindrical surface of said main bearing, forming a bottom enclosure for the instrument and secured to said base, a second flat circular plate carried by said alidade above said first flat circular plate, and a plurality of balls between said flat circular plates supporting the weight of the alidade and permitting its free rotation.

7. In a surveying instrument having an alidade, a base for mounting the instrument on a levelling head and a protractor scale, the combination of a main bearing having concentric inner and outer surfaces carried by the base, at least said outer surface being cylindrical, a spindle mounted for rotation within said main bearing about the axis of its inner surface carrying the protractor scale, an annular bearing mounted for rotation on the outside of said main bearing about the axis of its outer cylindrical surface, said alidade being centered on the axis of said main bearing by said annular bearing, a first flat circular plate carried by said base, a second flat circular plate carried by said alidade above said first flat circular plate, a plurality of balls between said flat circular plates supporting the weight of the alidade and permitting its free rotation, a clamp for clamping said protractor to said alidade for rotation therewith, and clamp and fine adjustment means for clamping said alidade to said base and permitting fine adjustment of said alidade with respect to said base.

8. In a surveying instrument having an alidade, a base for mounting the instrument on a leveling head and a protractor scale, the combination of a main bearing having concentric inner and outer surfaces carried by the base, a spindle mounted for rotation within said main bearing about the axis of its inner surface carrying the protractor scale, a first flat circular plate carried by said base, a second flat circular plate carried by said alidade above said first flat circular plate and mounted for rotation around said main bearing about the axis of its outer surface thereby centering said alidade on the axis of said main bearing, a plurality of balls between said flat circular plates supporting the weight of the alidade and permitting its free rotation, a clamp for clamping said protractor to said alidade for rotation therewith, and clamp and fine adjustment means for clamping said alidade to said base and permitting fine adjustment of said alidade with respect to said base.

ALLISTER L. BAKER.

References Cited in the file of this patent

UNITED STATES PATENTS

| Number | Name | Date |
| --- | --- | --- |
| 184,922 | Spoffard | Nov. 28, 1876 |
| 626,655 | Guillaume et al. | June 6, 1899 |
| 918,190 | Nagy | Apr. 13, 1909 |
| 1,224,725 | Erickson | May 1, 1917 |
| 1,307,205 | Mihalyi | June 17, 1919 |
| 1,777,853 | Mahler | Oct. 7, 1930 |
| 2,164,051 | Brunson | June 27, 1939 |
| 2,579,067 | Cunningham | Dec. 18, 1951 |

FOREIGN PATENTS

| Number | Country | Date |
| --- | --- | --- |
| 402,027 | Great Britain | Nov. 23, 1933 |
| 518,148 | Great Britain | Feb. 19, 1940 |
| 548,512 | Great Britain | Oct. 13, 1942 |
| 232,925 | Switzerland | Sept. 16, 1944 |